United States Patent [19]

Group

[11] 4,285,448

[45] Aug. 25, 1981

[54] APPARATUS UTILIZING GROOVED ROLLER FOR DISPENSING POWDER IN PREDETERMINED QUANTITY AND CONFIGURATION

[76] Inventor: Spencer M. Group, 421 E. 80th St., New York, N.Y. 10021

[21] Appl. No.: 73,921

[22] Filed: Sep. 10, 1979

[51] Int. Cl.³ .............................................. G01F 11/10
[52] U.S. Cl. .................................. 222/613; 222/624; 222/368
[58] Field of Search ............... 222/368, 624, 414, 410, 222/556, 613, 625; 401/219, 208; 141/284

[56] References Cited

U.S. PATENT DOCUMENTS

| 2,029,056 | 1/1936 | Carlson | 222/368 |
| 2,687,234 | 8/1954 | McLauchlan et al. | 222/368 X |
| 2,743,662 | 5/1956 | Pietrok et al. | 222/368 X |
| 3,263,264 | 8/1966 | Leland | 401/219 |

FOREIGN PATENT DOCUMENTS

| 365711 | 12/1922 | Fed. Rep. of Germany | 222/368 |
| 853833 | 3/1940 | France | 222/556 |
| 2338207 | 8/1977 | France | 222/368 |
| 43314 | 10/1926 | Norway | 401/219 |

Primary Examiner—Charles A. Marmor
Attorney, Agent, or Firm—Cahill, Sutton & Thomas

[57] ABSTRACT

A hopper gravity feeds powder into a closeable chute. The outlet of the chute is in wiping contact with the surface of a journaled and partially enclosed roller. One or more grooves are disposed in the roller for receiving gravity discharged powder from the chute. As the exposed part of the roller is rolled across a surface, the powder is transported by the grooves from the chute to the surface and deposited thereon in a configuration commensurate with that of the depositing groove.

1 Claim, 4 Drawing Figures

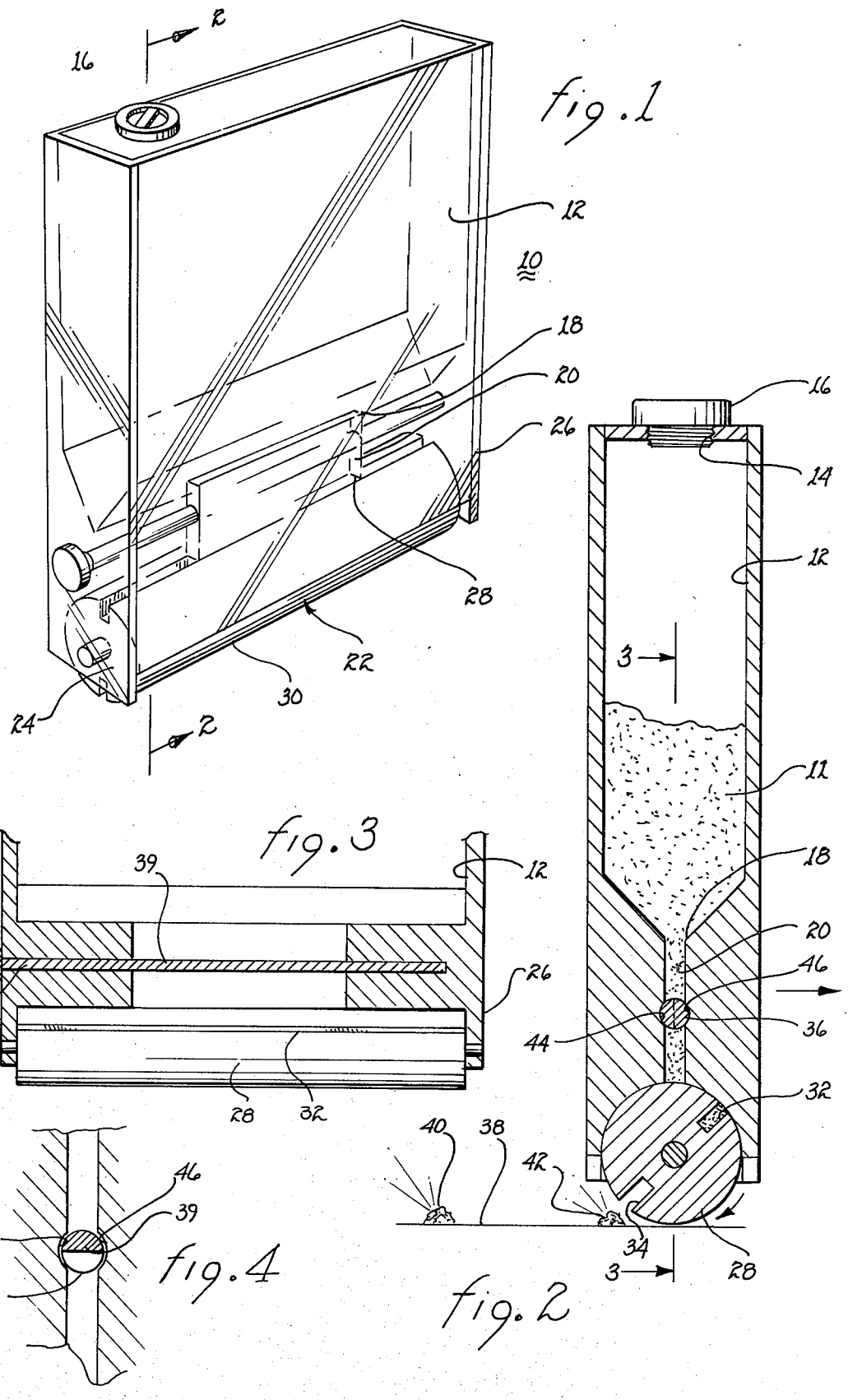

APPARATUS UTILIZING GROOVED ROLLER FOR DISPENSING POWDER IN PREDETERMINED QUANTITY AND CONFIGURATION

The present invention relates to dispensers and, more particularly, to dispensers for dispensing powdered materials in predetermined quantity and configuration.

Dispensers for powders and the like generally are of one of three types. The first type of dispenser contemplates one or more ports through which powder is dispensed by shaking or otherwise urging powder within the container through the port. The second type of dispenser contemplates the employment of a closeable port through which powder drops by gravity or is force-fed by air pressure or the like whenever the port is open. A third type contemplates the use of a chute or funnel for transporting the powder from a storage compartment to an underlying surface upon reciprocating movement of the funnel.

Each of these types of dispensers suffer from certain deficiencies. The powder, if finely ground, tends to permeate the environment in response to even the slightest air movement or in response to the impact of the powder dropping upon a surface. The configuration of the powder deposited upon a surface will be more or less inexact with respect to a norm, depending upon the "stacking" characteristics of the powder. Finally, the quantity of powder discharged per discharge will vary substantially, depending upon the compacting characteristics of the powder and the amount of mixing thereof with air during the deposition process.

It is therefore a primary object of the present invention to provide a dispenser for repetitively dispensing a uniform quantity of powder in a predetermined configuration.

Another object of the present invention is to provide a dispenser for selectively dispensing a limited quantity of powder.

Still another object of the present invention is to provide a dispenser employing a gravity feed system for dispensing compact quantities of powder.

Yet another object of the present invention is to provide a dispenser for depositing uniformly spaced predetermined quantities of powder upon a surface.

A further object of the present invention is to provide a leak-proof closure for a powder dispenser.

A still further object of the present invention is to provide a manually operated powder dispenser.

A yet further object of the present invention is to provide a pocket sized manual dispenser for powders.

These and other objects of the present invention will become apparent to those skilled in the art as the description thereof proceeds.

The present invention may be described with greater clarity and specifically with reference to the drawings, in which:

FIG. 1 is a perspective view illustrating the operative components of the present invention;

FIG. 2 is a cross-sectional view taken along lines 2—2, as shown in FIG. 1;

FIG. 3 is a cross-sectional view taken along lines 3—3, as shown in FIG. 2; and

FIG. 4 is a cross-sectional view illustrating closure of the powder discharge chute.

Referring to FIGS. 1, 2 and 3, there is shown a dispenser 10 for dispensing a powder 11. Herein, the term "powder" will be used to describe a plurality of materials useable in the dispenser, whether such materials are finely ground powder, granular material, fibrous material, other particulate materials, etc. The dispenser includes a hopper compartment 12 fillable through an aperture 14 closed by a threaded cap 16. The bottom of the hopper compartment is in fluid communication with inlet 18 of a downwardly extending chute 20. The bottom surface of the hopper may be V-shaped, as illustrated, to encourage gravity feed of powder 11 to inlet 18.

A roller 22 is journaled in sides 24 and 26 of the dispenser. Cylindrical surface 30 of the roller is located by the journals to make wiping contact with outlet 28 of chute 20. The wiping contact between outlet 28 and surface 30 constrains and blocks any flow of powder through the outlet.

Roller 22 includes one or more grooves, such as grooves 32, 34 disposed in surface 30. It may therefore be appreciated that as the roller rotates, powder will drop from outlet 28 of the chute into each groove as each groove passes past the outlet. The quantity of powder deposited in the groove is necessarily limited by the size of the groove itself; overfill is precluded by the edges of the outlet passing across the top of the groove as the roller rotates.

The powder within chute 20 will tend to be somewhat compacted by the pressure exerted by the overlying powder. Such inherently occurring compacting will tend to produce substantial uniformity in density and therefore in quantity of the powder. As the volume of powder deposited in grooves 32 and 34 is limited by the volume of the grooves themselves, the net quantity of powder per groove will be essentially uniform.

To prevent loss of powder through inadvertent rotation of roller 22, means are provided to shut off or preclude flow of the powder through chute 20. This means may take the form of a rod 36 extending across the chute and journaled within the dispenser. That section of the rod which is coincident with the width of chute 20 is a half circle in cross-section, as illustrated in FIGS. 2, 3 and 4. With such cross-section, the rotational orientation of the rod by turning knob 37 may be used to permit or impede downward flow of the powder through the chute. That is, orientation of the rod as illustrated in FIG. 4 will effectively block downward flow of the powder while the orientation illustrated in FIG. 2 will permit powder flow intermediate rod half section 39 and the opposed surface of the chute.

To insure a good seal of rod 36 within chute 20, the diameter of the rod may be somewhat greater than the breadth of the chute. To accommodate the increased diameter of the rod, partial cylindrical depressions 44, 46 would be formed within the opposing surfaces of the chute. These depressions would provide substantial contact area intermediate rod 36 and the sides of the chute to obtain more effective blockage against powder flow than would exist by the point contact resulting were the rod of the same diameter as the breadth of the chute. The resulting seal would provide assurance against inadvertent loss of the powder despite jostling or rough handling of the dispenser.

Powder is dispensed from dispenser 10 upon a surface, such a surface 38 by locating roller 22 upon the surface and moving the dispenser in such a manner as to cause rotation of the roller. As the roller rotates, each groove therein will be filled with powder on passage thereof past the outlet of the chute. Further rotation of the roller will locate the groove in proximity to surface 38 and the powder will drop from the groove onto the surface. Assuming that the grooves are longitudinally oriented, as illustrated in FIG. 3, a plurality of elongated mounds 40, 42 of powder will be deposited upon surface 38 and spaced apart from one another by a distance commensurate with a circumferential distance between the grooves in the roller. As the powder has been compacted to some degree by the pressures extant within chute 20, the quantity of powder in each mound will be repetitively uniform. Similarly, the physical configuration of each mound will be repetitively similar, if not identical.

Depending, of course, upon the ultimate use of the deposited mounds of powder, the configuration of the mounds may be varied by simply varying the configuration of the grooves.

It is to be understood that dispenser 10, as it is not dependent upon a specific size for operation of any of its elements, may be sized small enough to fit within one's pocket or purse. Alternatively, it may be relatively massive and not readily transportable.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A refillable, manually-operated dispenser having a leak proof closure for dispensing powder in uniformly-spaced, repeated mounds upon a surface while minimizing the mixing of air with the powder as the powder impacts the surface, each of the dispensed mounds of powder being of a predetermined compact quantity and configuration, said dispenser comprising in combination:

a. a hopper for holding the powder, said hopper including a sealable aperture means for loading said hopper with powder, said hopper having a V-shaped downwardly directed bottom for directing powder under the force of gravity toward the bottom of said hopper;

b. a downwardly extending chute having an inlet in fluid communication with the V-shaped bottom of said hopper for discharging the powder from said hopper through an outlet of said chute, said chute including depressions within opposed sides thereof;

c. a roller having a cylindrical surface in wiping contact with said chute outlet, said roller including at least one groove of rectangular cross-section into which powder from said chute outlet drops as said groove passes said chute outlet, the powder within said groove dropping therefrom onto the surface upon rotation of said roller along the surface; and d. a rod including a half-round section journalled within said depressions of said chute and coincident with said chute, said rod being positionable in a first and second position for impeding and permitting, respectively, flow of powder through said chute.

* * * * *